US011418863B2

(12) United States Patent
Lynch

(10) Patent No.: US 11,418,863 B2
(45) Date of Patent: Aug. 16, 2022

(54) COMBINATION SHOWER ROD AND ENTERTAINMENT SYSTEM

(71) Applicant: Damian A Lynch, Brooklyn, NY (US)

(72) Inventor: Damian A Lynch, Brooklyn, NY (US)

( * ) Notice: Subject to any disclaimer, the term of this patent is extended or adjusted under 35 U.S.C. 154(b) by 0 days.

(21) Appl. No.: 17/359,010

(22) Filed: Jun. 25, 2021

(65) Prior Publication Data

US 2021/0409851 A1 Dec. 30, 2021

Related U.S. Application Data

(60) Provisional application No. 63/043,977, filed on Jun. 25, 2020.

(51) Int. Cl.

| H04R 1/02 | (2006.01) |
|---|---|
| G06F 3/16 | (2006.01) |
| H04B 1/08 | (2006.01) |
| A47K 3/38 | (2006.01) |
| F21V 33/00 | (2006.01) |
| F21Y 115/10 | (2016.01) |

(52) U.S. Cl.
CPC .............. *H04R 1/02* (2013.01); *A47K 3/38* (2013.01); *F21V 33/004* (2013.01); *F21V 33/0056* (2013.01); *G06F 3/16* (2013.01); *H04B 1/08* (2013.01); *F21Y 2115/10* (2016.08)

(58) Field of Classification Search
CPC H04R 1/02; A47K 3/38; F21V 33/004; F21V 33/0056; G06F 3/16; H04B 1/08; F21Y 2115/10
USPC ........................................................ 381/334
See application file for complete search history.

(56) References Cited

U.S. PATENT DOCUMENTS

| 6,282,823 | B1 | 9/2001 | Brown |
| 8,819,812 | B1 | 8/2014 | Weber et al. |
| 9,868,449 | B1 | 1/2018 | Holz et al. |
| 10,322,728 | B1 | 6/2019 | Porikli et al. |
| 2004/0117945 | A1* | 6/2004 | Huang .................... A47H 1/14 16/102 |
| 2004/0189720 | A1 | 9/2004 | Wilson et al. |
| 2005/0217155 | A1 | 10/2005 | Santa Cruz |
| 2009/0251407 | A1 | 10/2009 | Flake et al. |
| 2012/0093360 | A1 | 4/2012 | Subramanian et al. |
| 2012/0114255 | A1 | 5/2012 | Kimura |
| 2012/0299862 | A1 | 11/2012 | Matsumoto et al. |
| 2013/0211843 | A1 | 8/2013 | Clarkson |
| 2013/0271360 | A1 | 10/2013 | MacDougall et al. |
| 2015/0193656 | A1 | 7/2015 | Kounavis et al. |

(Continued)

*Primary Examiner* — Vivian C Chin
*Assistant Examiner* — Friedrich Fahnert
(74) *Attorney, Agent, or Firm* — Mark Terry

(57) ABSTRACT

A system for providing shower entertainment. The system includes a horizontally extendable shower rod including a first portion and a second portion, wherein the second portion is configured to retract into and extend from a channel disposed within the first portion, a plurality of lights disposed along an exterior surface of the shower rod, a plurality of speakers configured for playing sounds, a processor communicably coupled to the plurality of lights and the plurality of speakers, the processor configured for receiving audio data, via radio frequency, and playing said audio data on the plurality of speakers, and activating and deactivating the plurality of lights; and a rechargeable battery configured for providing power to the plurality of lights, the plurality of speakers and the processor.

20 Claims, 16 Drawing Sheets

(56) References Cited

U.S. PATENT DOCUMENTS

| | | |
|---|---|---|
| 2015/0197185 A1 | 7/2015 | Jones |
| 2015/0346820 A1 | 12/2015 | Poupyrev et al. |
| 2015/0370326 A1 | 12/2015 | Chapeskie et al. |
| 2016/0170492 A1 | 6/2016 | DeBattista et al. |
| 2016/0320852 A1 | 11/2016 | Poupyrev |
| 2017/0079482 A1* | 3/2017 | Tsibulevskiy ......... E03C 1/0408 |
| 2017/0090582 A1 | 3/2017 | Ganesan et al. |
| 2018/0092485 A1* | 4/2018 | Viedt ..................... F26B 21/06 |
| 2018/0267617 A1 | 9/2018 | Giannuzzi |

* cited by examiner

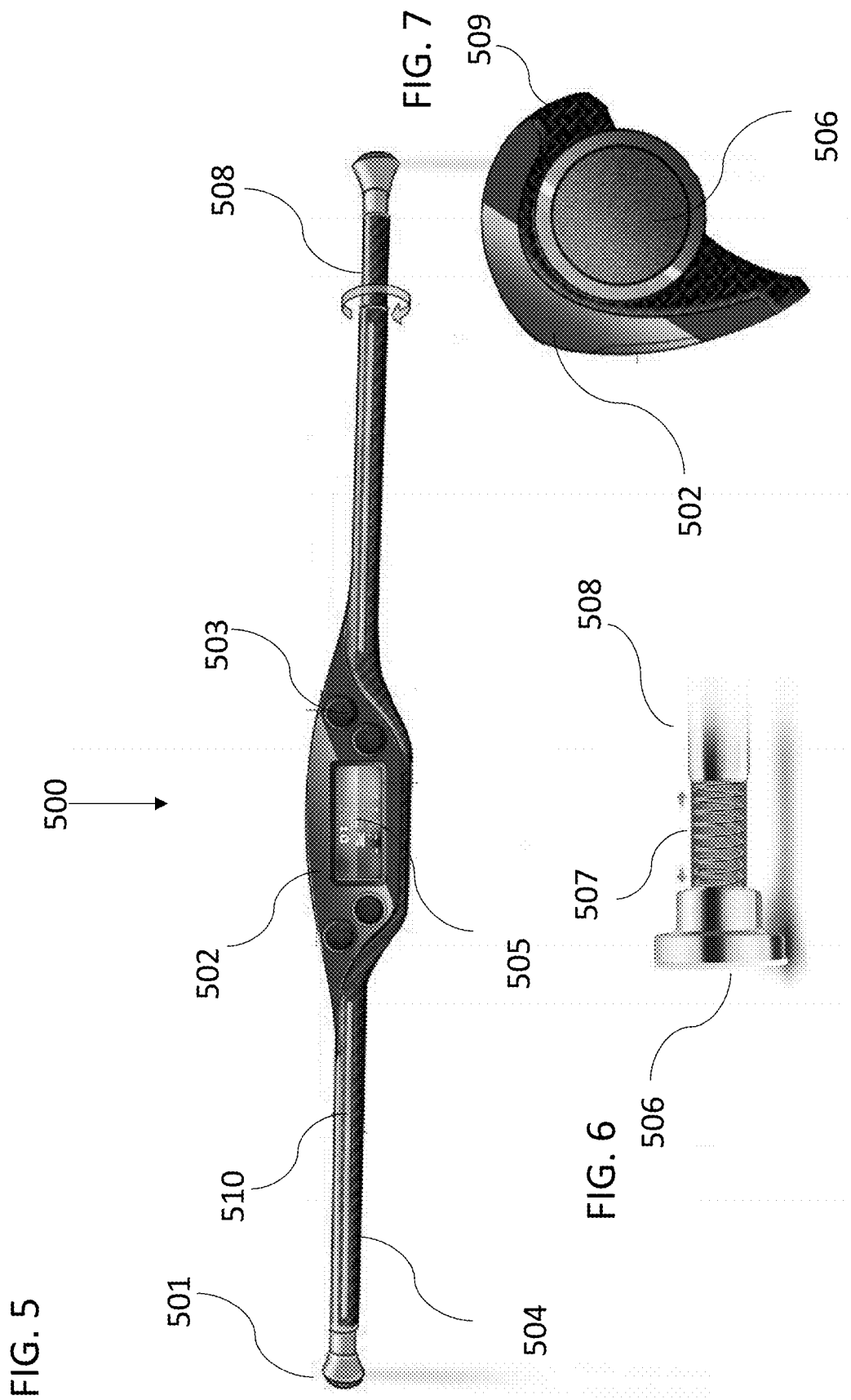

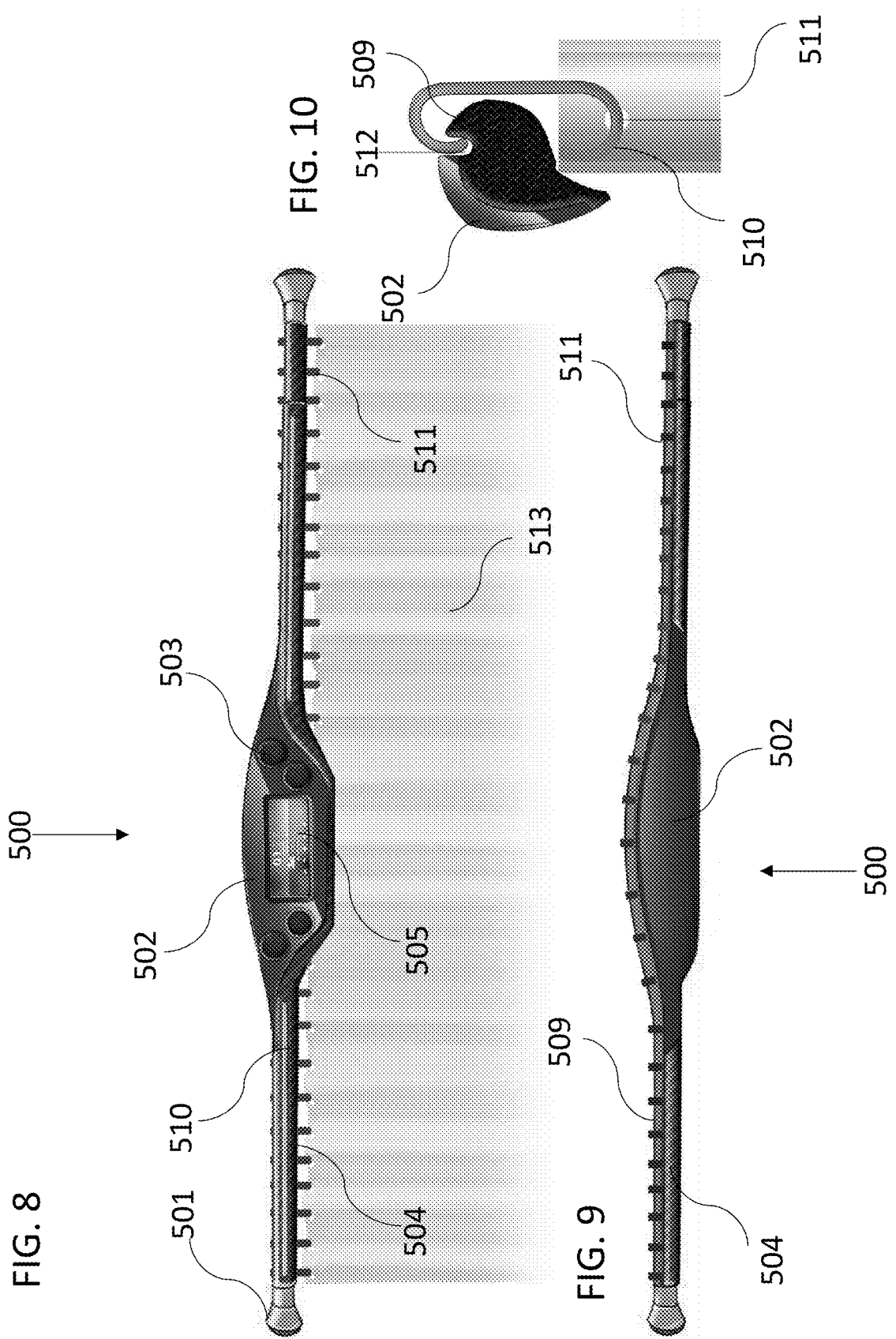

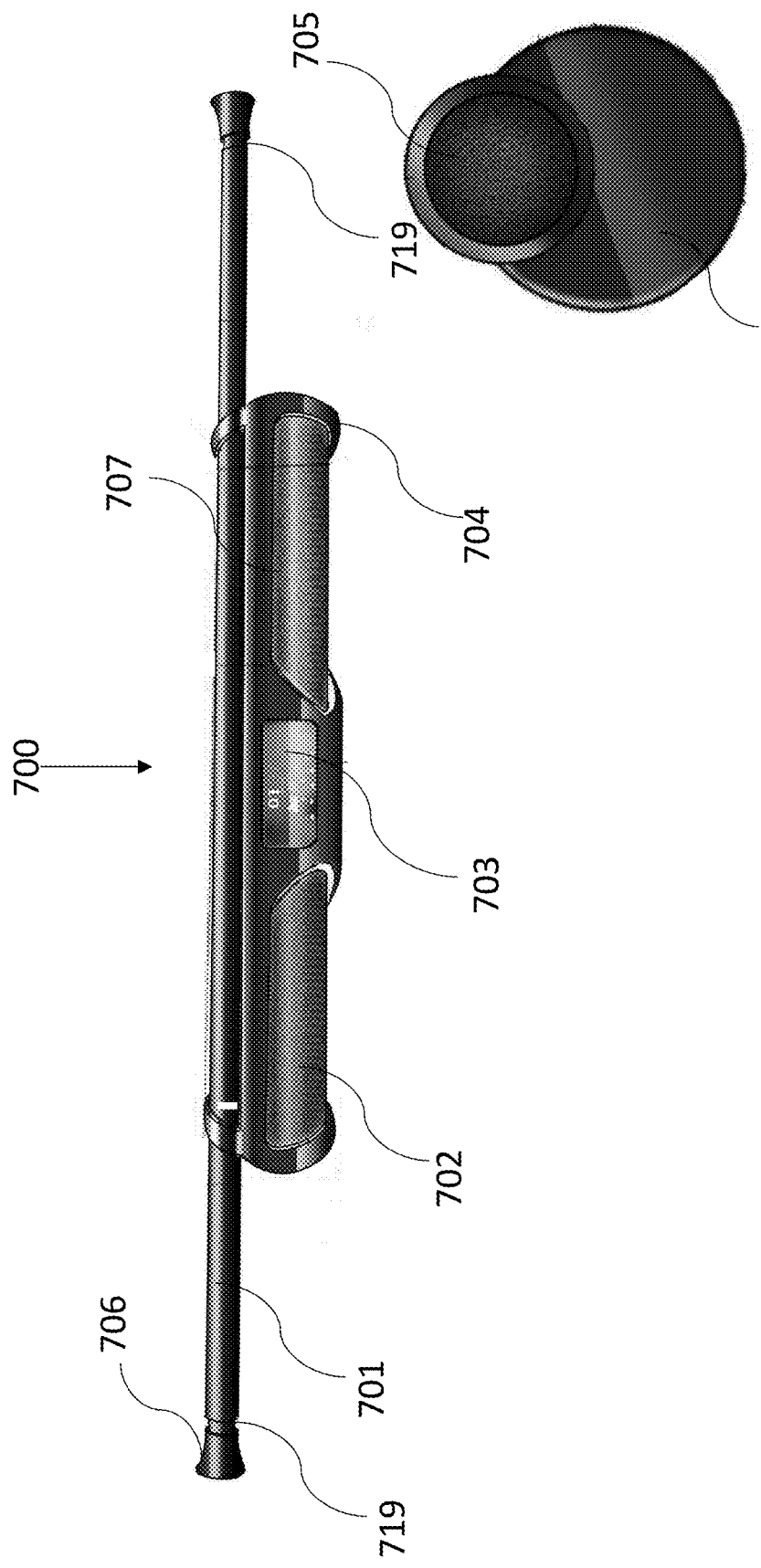

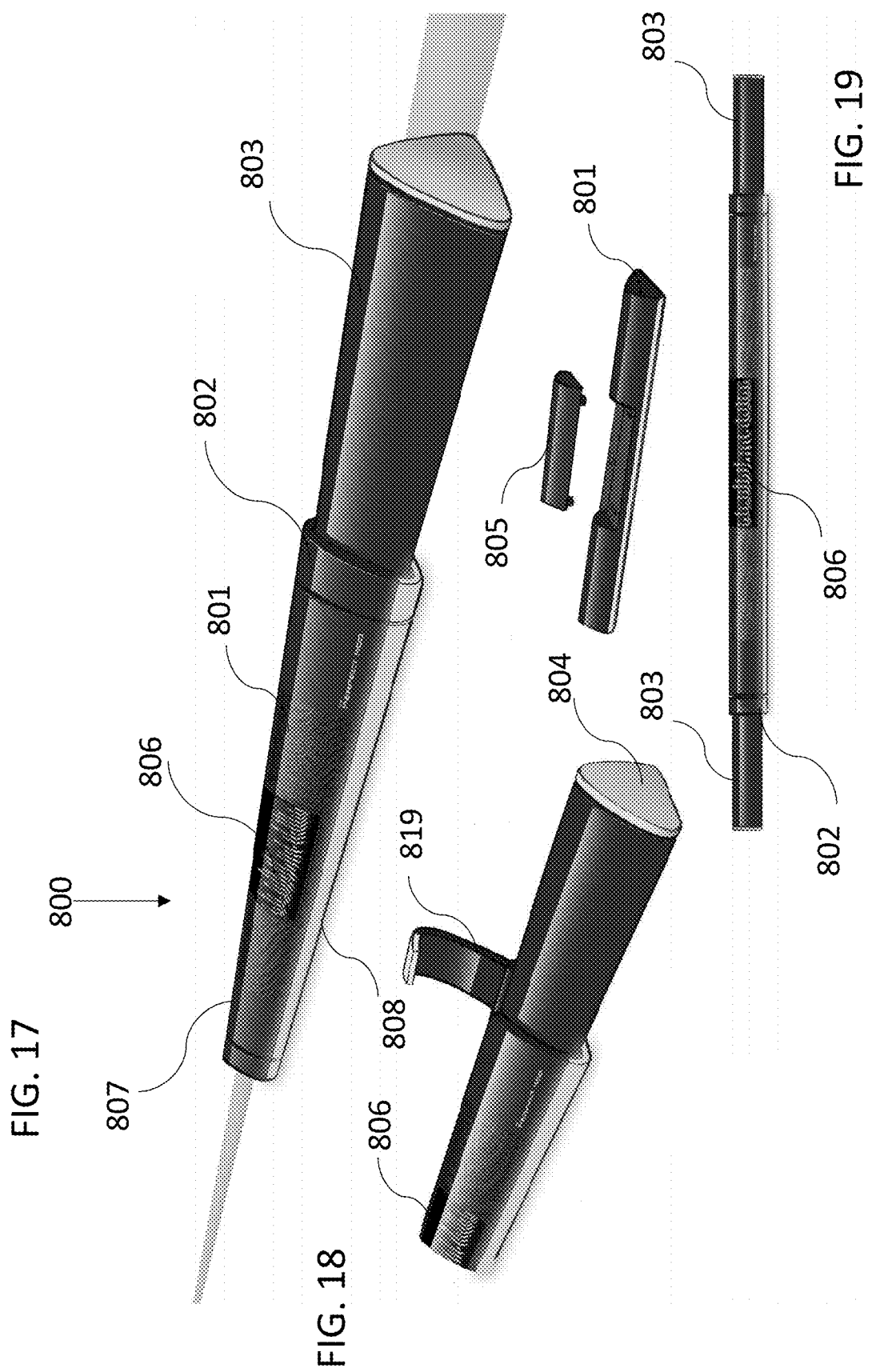

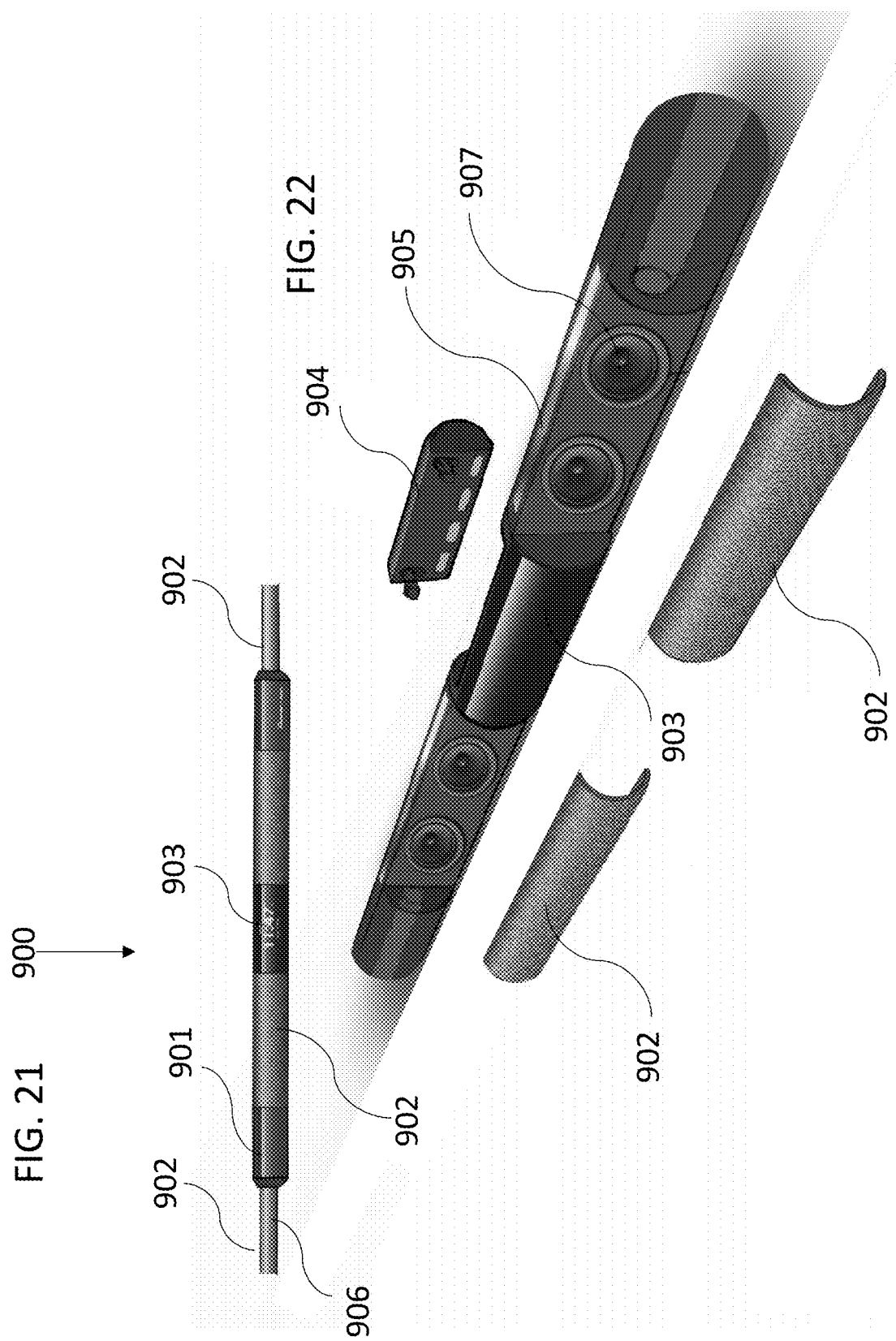

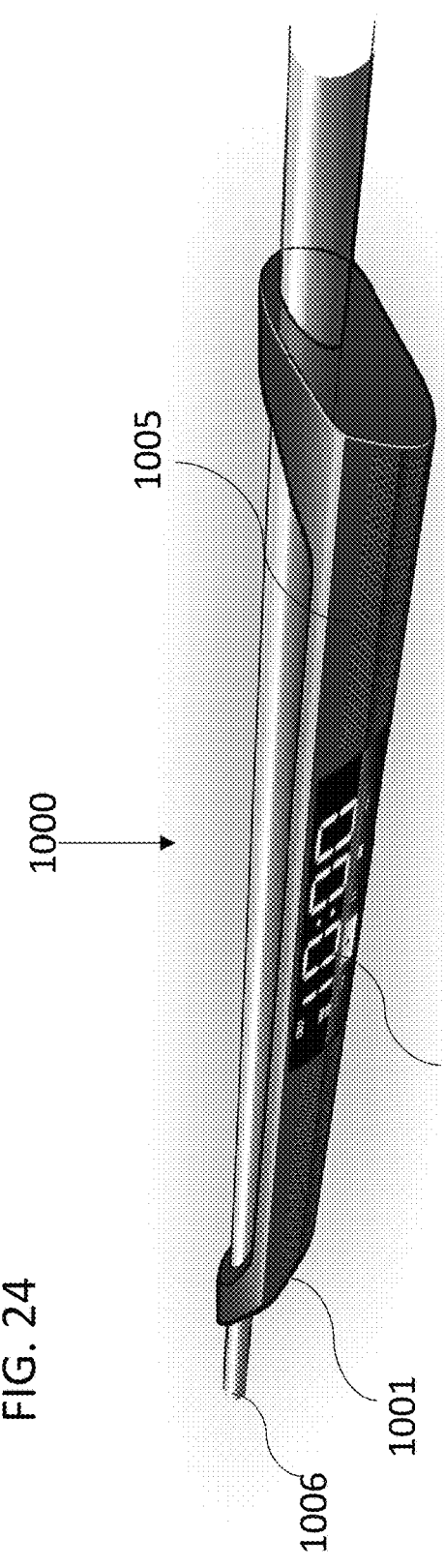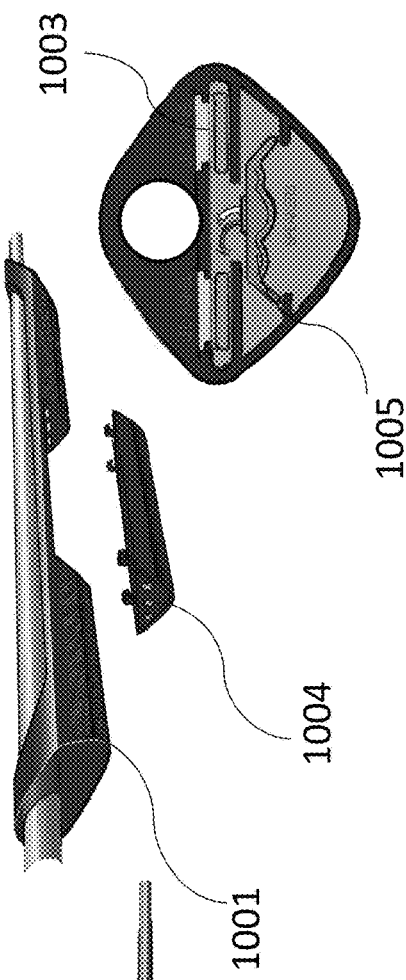
FIG. 24
FIG. 25
FIG. 26
FIG. 27
FIG. 28

COMBINATION SHOWER ROD AND ENTERTAINMENT SYSTEM

CROSS-REFERENCE TO RELATED APPLICATIONS

This patent application claims priority to provisional patent application 63/043,977 filed on Jun. 25, 2021 entitled "Combination Shower Rod and Entertainment System." The subject matter of patent application 63/043,977 is hereby incorporated by reference in its entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The claimed embodiments relate to the field of shower accessories, and more particularly, to the field of entertainment systems configured for bathroom and/or shower settings.

BACKGROUND

Historically, enjoying entertainment while in bathroom environments has been a common desire among individuals particularly because of the significant amount of time spent in the bathroom whether for preparation to leave one's residence or performing routines when returning to said residence. Previously, in order for one to enjoy entertainment in a bathroom environment, they would have to utilize specific waterproof devices such as shower radios, waterproof media players, and other applicable devices. A more recent approach has been for individuals to utilize their personal computing devices such as mobile devices, tablets, and other applicable devices in bathroom environments in an attempt to generate a more personalized entertainment experience where they can pick and choose multimedia content to enjoy. However, a major drawback to this approach is that not only are the aforementioned computing devices not configured to function at maximum capacity in showers due to the extreme amount of moisture and steam produced, but also in order to integrate an entertainment system, said individuals would have to supply additional devices such as displays, speakers, amplifiers, and other applicable devices all of which must be waterproof in order to provide a full service entertainment system suitable for use in a shower. Thus, this approach is not feasible due to the fact that it requires placing additional devices into a significantly confined area that is frequently subject to high temperatures and excessive steam.

In addition, existing shower audio devices are limited in particular when it comes to stereo capabilities. For example, there are speakers that are configured to function individually within a shower setting, but these speakers are not configured to operate in unison with others to provide a stereophonic sound within an enclosed area without the aforementioned issue of adding more devices within a confined area. Furthermore, these waterproof speakers require interaction with a computing device that currently at the very least demands interaction with a touchable interface that is limited in its functionality once in contact with moisture, heat, and steam. For example, a mobile device in communication with a waterproof portable speaker still would not be able to be fully functional within a shower without a specific casing that supports mounting and screen use within wet environments.

Therefore, there exists a need for improvements over the prior art and more particularly for a waterproof entertainment system that is fully functional within shower environments without requiring additional devices and supporting mechanisms thereof.

SUMMARY

This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

In one embodiment, a system for shower entertainment is disclosed. The system includes a horizontally extendable shower rod comprising a first portion and a second portion, wherein the second portion is configured to retract into and extend from a channel disposed within the first portion; a plurality of lights disposed along an exterior surface of the shower rod; a plurality of speakers configured for playing sounds; a processor communicably coupled to the plurality of lights and the plurality of speakers, the processor configured for: 1) receiving audio data, via radio frequency, and playing said audio data on the plurality of speakers, and 2) activating and deactivating the plurality of lights; and a rechargeable battery configured for providing power to the plurality of lights, the plurality of speakers and the processor.

To the accomplishment of the above and related objects, claimed embodiments may be embodied in the form illustrated in the accompanying drawings, attention being called to the fact, however, that the drawings are illustrative only, and that changes may be made in the specific construction illustrated and described within the scope of the appended claims. The foregoing and other features and advantages of the claimed embodiments will be apparent from the following more particular description of the preferred embodiments, as illustrated in the accompanying drawings.

BRIEF DESCRIPTION OF THE DRAWINGS

The accompanying drawings, which are incorporated in and constitute part of this specification, illustrate embodiments and together with the description, serve to explain the principles of the disclosed embodiments. The embodiments illustrated herein are presently preferred, it being understood, however, that the claimed embodiments are not limited to the precise arrangements and instrumentalities shown, wherein:

FIG. 5 is an illustration of a front view of a waterproof entertainment system, according to a second example embodiment;

FIG. 6 is an illustration of an end portion of a waterproof entertainment system, according to the second example embodiment;

FIG. 7 is an illustration of a side view of a waterproof entertainment system, according to the second example embodiment;

FIG. 8 is an illustration of a front view of a waterproof entertainment system with shower curtain, according to the second example embodiment;

FIG. 9 is an illustration of a rear view of a waterproof entertainment system with shower curtain, according to the second example embodiment;

FIG. 10 is an illustration of another side view of a waterproof entertainment system, according to the second example embodiment;

FIG. 14 is an illustration of a front view of a waterproof entertainment system, according to a fourth example embodiment;

FIG. 15 is an illustration of a side view of a waterproof entertainment system, according to the fourth example embodiment;

FIG. 17 is an illustration of a perspective front view of a waterproof entertainment system, according to a fifth example embodiment;

FIG. 18 is an illustration of another perspective front view of a waterproof entertainment system, according to the fifth example embodiment;

FIG. 19 is an illustration of a front disassembled view of a waterproof entertainment system, according to the fifth example embodiment;

FIG. 21 is an illustration of a front view of a waterproof entertainment system, according to a sixth example embodiment;

FIG. 22 is an illustration of a perspective front view of a waterproof entertainment system, according to the sixth example embodiment;

FIG. 24 is an illustration of a perspective front view of a waterproof entertainment system, according to a seventh example embodiment;

FIG. 25 is an illustration of a front view of a waterproof entertainment system, according to the seventh example embodiment;

FIG. 26 is an illustration of a top view of a waterproof entertainment system, according to the seventh example embodiment;

FIG. 27 is an illustration of a rear perspective view of a waterproof entertainment system, according to the seventh example embodiment;

FIG. 28 is an illustration of a cross sectional view of a waterproof entertainment system, according to the seventh example embodiment;

Like reference numerals refer to like parts throughout the several views of the drawings.

DETAILED DESCRIPTION

Figure 1:
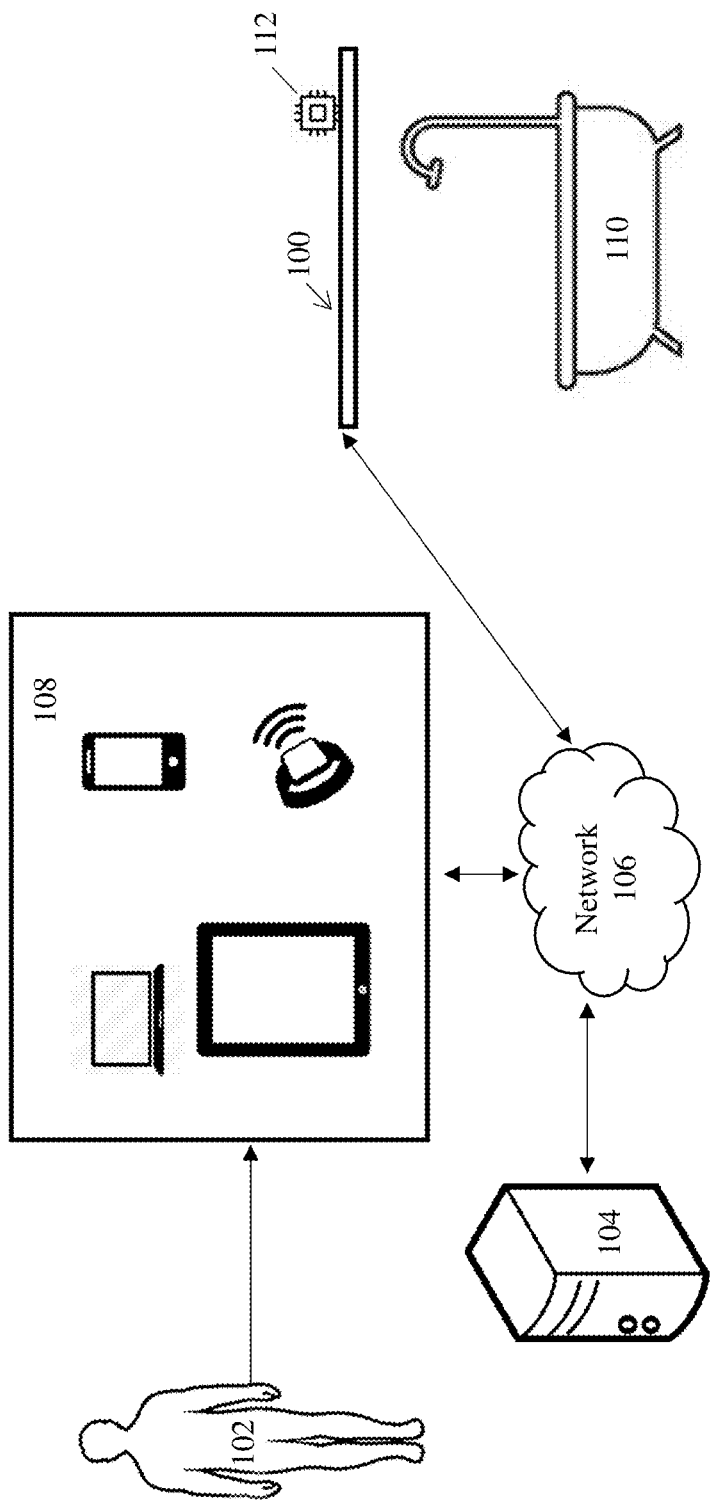
FIG. 1 is a block diagram of a waterproof entertainment system, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a waterproof entertainment system configured to provide stereophonic sound throughout a bathroom and/or shower environment in a manner that is not susceptible to high temperatures, excess steam, and other various factors inherent to taking a shower. The present embodiment improves over the prior art by providing a centralized platform including a waterproof digital display and communicatively coupled waterproof speakers configured to be integrated within a shower rod in order to provide an entertainment experience via presenting music, videos, news content, and other various forms of information to a user while in the shower that circumvents common issues associated with utilizing devices within a shower. Additionally, the present embodiment also improves over the prior art by providing retraction/extension mechanisms, opening/closing mechanisms, lighting mechanisms, and supporting electrical components in order to not only assist a user while in the shower, but also provide efficiency associated with the aforementioned features resulting in improvement of the user's overall shower/bathroom experience.

Referring now to FIG. 1, an example waterproof entertainment system 100 configured for a shower 110 is depicted. In one embodiment, the environment comprises a user 102 configured to interact with at least one server 104 via one or more computing devices 108, wherein server 104 and each of the one or more computing devices are communicatively coupled by a network 106, such as the internet. In one embodiment, waterproof entertainment system 100 comprises at least a processor 112 configured to be communicatively coupled to server 104 and computing devices 108 via network 106. It is to be understood that system 100 may be designed and configured to include fewer, more, or different components, and the division of work between the components may vary depending on the arrangement. In one embodiment, user 102 is configured to interact with processor 112 of system 100 via interactions with a centralized platform provided by server 104 via the actions of user 102 performed on computing devices 108. In one embodiment, computing devices 108 include but are not limited to a mobile phone, tablet, smart phone, smart tv, application, over-the top media service (OTT), streaming platform, desktop, laptop, wearable technology, or any other device or system configured to allow user-side access to internet content. For example, a mobile application supported by server 104 may be presented to user 102 on a computing device 108 in which user 102 is presented a plurality of options relating to entertainment, such as but not limited to music streaming services, video streaming services, news/media streaming services, and any other applicable sources of entertainment in which (based upon on the selection provided by user 102) the content is sourced from server 104 and received by system 100 for executing (i.e., playing) on system 100.

In one embodiment, computing devices 108 may form a network of devices associated with user 102 configured to continuously collect data from user 102 in real-time, said data including but not limited to user activity on computing devices 108, user audio received via computing devices 108, user preferences/settings applied to computing devices 108, or any other applicable data configured to be extracted from computing devices 108. It is to be understood that server 104 utilizes network 106 to provide a communications network interface configured to facilitate a data flow between computing devices 108 and processor 112 of system 100. In one embodiment, the network interface may be a radio frequency (RF) interface configured to provide network interface functions for processor 112 of system 100 to wirelessly communicate with computing devices 108 and various components of system 100 disclosed throughout in accordance with a communication protocol (e.g., any wireless standard including IEEE 802.11a, 802.11b, 802.11g, 802.11n, 802.15, 4G mobile communication standard, 5G mobile communication standard, and so on). In one embodiment, system 100 is configured to utilize wireless technologies such as for example, ZigBee, Bluetooth, WLAN, and WiMAX.

It is to be understood that the purpose of the configuration of system 100 is to circumvent computing devices 108 being brought into the bathroom altogether but still maintaining full functionality. Thus, in order to accomplish this, system 100 may be configured to integrate Wi-Fi extenders, signal boosters, or any other applicable devices configured to circumvent functionalities of system 100 associated with range. Furthermore, the term Wi-Fi as used herein may be considered to refer to any of Wi-Fi 4, 5, 6, 6E, or any variation thereof. The data communicated on network 106 can be implemented using a variety of protocols on a network such as a wide area network (WAN), a virtual private network (VPN), metropolitan area networks (MANs), system area networks (SANs), a public switched telephone network (PTSN), a global Telex network, or a 2G, 3G, 4G or 5G network accessible via physical media/wiring. Such networks can also generally contextually be referred to herein as the Internet or the cloud.

It is to be understood that server 104 may be associated with a source exterior to system 100 in instances where the content being provided to processor 112 of system 100 is not accounted for within server 104 or network 106 in which server 104 actively retrieves media content external to system 100 via accessing network 106 or one or more networks accessible through network 106. For example, user 102 may wish to access content available on third party platforms/services that is not currently provided on network 106, in which said third party platforms/services will send a request to server 104 to transmit content. Server 104 may prompt user 102 as to whether user 102 wishes to receive the content and based upon a response from user 102 validating reception of the content, transmits the content to network 106 for presentation on computing device 108.

Figure 2:
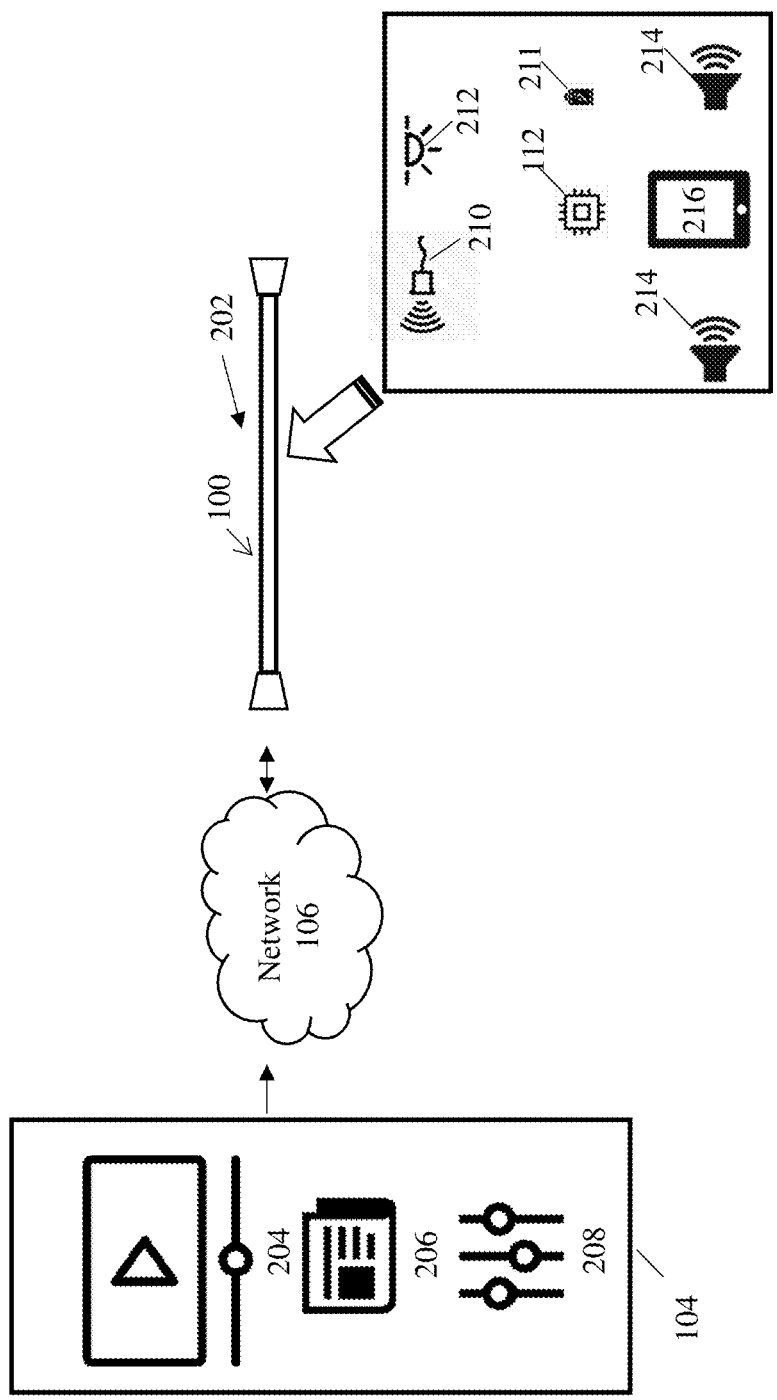
FIG. 2 is another block diagram of the waterproof entertainment system, according to an example embodiment.

Referring now to FIG. 2, a view of a waterproof entertainment system 100 is depicted. In one embodiment, system 100 comprises a horizontally extended shower rod 202 comprising a sensor 210, a lighting mechanism 212, a plurality of waterproof speakers 214, and a waterproof display 216 (including a user interface) each of which are communicatively coupled to processor 112 via a wireless or waterproof wired configuration. It is to be understood that each of the plurality of waterproof speakers 214 are communicatively coupled via network 106 and configured to emit audio in unison; however, each of the plurality of waterproof speakers may have respective settings adjusted (bass, volume, etc.) based on inputs of user 102 to computing devices 108 or an applicable IR controller. In one embodiment, sensor 210 may be a position sensor, pressure sensor, proximity sensor, thermometer, motion sensor, voice sensor (microphone) or any combination thereof configured to be communicatively coupled to processor 112.

In one embodiment, lighting mechanism 212 comprises at least a light source such as a light-emitting-diode (LED) in addition to a plurality of lights all of which may be disposed across an exterior surface of shower rod 202 enabling user 102 to have sufficient amount of lighting when within shower 110, wherein lighting mechanism is configured to support various hues, presentations (strobing, flashings, etc.), and colors of lights being emitted at varying frequencies subject to the preference of user 102. In one embodiment, lighting mechanism 212 is configured to emit light from shower rod 202 in synchronization with the audio being emitted from the plurality of waterproof speakers 214.

In one embodiment, the plurality of waterproof speakers 214 each comprise a membrane of elastic and/or waterproof material configured to endure excessive amounts of liquid and moisture, wherein each of the waterproof speakers 214 are configured to be communicatively coupled to each other via network 106 in order to render a unison functionality resulting in a stereophonic sound being produced within shower 110. At least one of the waterproof speakers of the plurality of waterproof speakers 214 are directly affixed to shower rod 202. However, the plurality of waterproof speakers 214 are configured to be affixed or placed within any applicable surface of shower 110 and various positionings of the waterproof speakers are within the spirit and scope of the claimed embodiments. In one embodiment, waterproof display 216 is a liquid crystal display comprising a waterproof layer composed of a waterproof ventilative material configured to allow user 102 to interact directly with the surface of waterproof display 216 without interruption from interactions inherent to showering such as liquid contacting the surface of waterproof display 216. It is to be understood that waterproof display 216 may function as the interactive hub associated with processor 112 in which user 102 may interact directly with waterproof display 216 in order to utilize components of system 100. For example, user 102 may utilize waterproof display 216 to adjust or control features associated with system 100, such as adjusting the intensity of the lighting associated with lighting mechanism 212 or adjust the ventilation in the bathroom based on one or more factors relating to the atmosphere acquired from sensor 210.

In one embodiment, server 104 provides a centralized platform to computing devices 108 allowing user 102 to provide at least a plurality of multimedia content 204, news/current events content 206, and a user/system preferences 208. In one embodiment, the centralized platform may serve as a software application configured to be presented on waterproof display 216 allowing waterproof display 216 to be associated with and/or serve as an extension of computing devices 108. For example, user 102 may generate a music playlist on the centralized platform on computing devices 108 and said music playlist may be accessed on waterproof display 216 giving user 102 the ability to pause/stop the music playing on waterproof speakers 214 or adjust the volume for waterproof speakers 214 either in unison or via a speaker-by-speaker control function. In one embodiment, multimedia content 204 may be any recordings, podcasts, courses, texts, music, video, animation, graphics, or combination thereof which is transmitted from server 104 to processor 112 of system 100 via network 106 and/or computing devices 108 and received by processor 112 in order for audio output of multimedia content 204 to be emitted through plurality of waterproof speakers 214 and for visual output to be displayed via waterproof display 216.

In one embodiment, news content 206 may be any current coverage from various media outlets, information relating to the current weather, tips/suggestion for user 102 based on data extracted from computing devices 108, or any other applicable forms of literature that are configured to be presented on waterproof display 216 and/or emitted aloud on waterproof speakers 214. Server 104 may actively search for relevant and breaking news by submitting queries to databases outside of system 100 and extracting news stories and other relevant information based on user/system preferences 208. In one embodiment, the set of user/system preferences 208 may be based on information associated with the activities of user 102 on the computing devices 108 or settings and configurations that user 102 has applied directly to computing devices 108 or possibly other devices that operate on network 106. In one embodiment, user/system preferences 208 are provided by user 102 in order to instruct processor 112 of system 100 to perform specific actions. For example, user 108 can set one or more alarms on computing devices 108 configured to be emitted by the plurality of waterproof speakers 214. In another working example, user/system preferences 208 can be utilized to notify user 102 via emitting an alarm through waterproof speakers 214 upon the water temperature in shower 110 exceeding a predetermined threshold indicating that it is the ideal temperature for user 102 to enter into shower 110 based upon his/her preferred water temperature. In one embodiment, user/system preferences 208 may allow user 102 to indicate that lightening mechanism 212 should adjust the intensity of the light based upon the time of day that system 100 is being utilized. For example, lighting mechanism 212 may be preset by user/system preferences 208 to emit lighting at progressive intensities in increments simultaneously with the emission of the wake-up alarm in order to assist user 102 with waking up.

In one embodiment, sensor 110 functions as an audio receiving mechanism coupled to processor 112 configured to distinguish the voice of user 102 from various sounds occurring within shower 110 such as running water and audio being emitted from speaker 214 in order to assist processor 112 in interpreting commands received in audio segments. For example, user 102 may utter "Dim the lights and turn up the volume" in which sensor 110 would extract a set of triggering commands from the statement and transmit a plurality of executable instructions to processor 112 resulting in the intensity of the lights associated with lighting mechanism 212 to decrease and the volume emitted from waterproof speakers 214 to increase.

In one embodiment, power source 211 may be a rechargeable battery, motor, solar power mechanism, or any other applicable type of power source configured to supply electrical power to system 100 in a manner that is not altered by the moist and humid environment inherent to shower 110.

Figure 3:
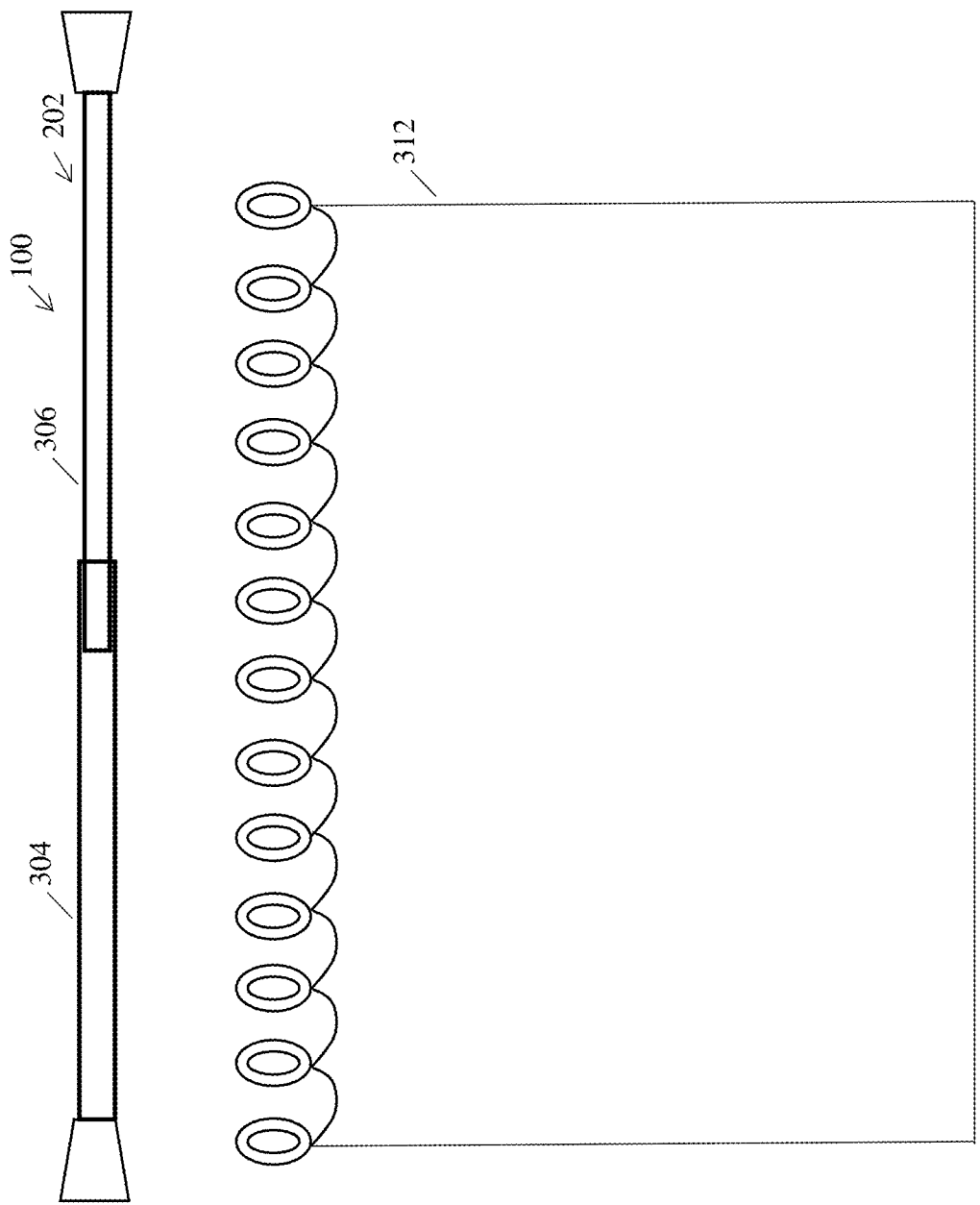
FIG. 3 is an illustration of the waterproof entertainment system, according to an example embodiment.

Referring now to FIG. 3, the waterproof entertainment system 100 is depicted. In one embodiment, system 100 comprises the shower rod 202 further comprising a first portion 304 and a second portion 306. Components of shower rod 202 may be comprised of material such as carbon steel, stainless steel, aluminum, titanium, other metals or alloys, composites, ceramics, polymeric materials such as polycarbonates, such as acrylonitrile butadiene styrene (ABS plastic), Lexan™, and Makrolon™. The components may be formed from a single piece or from several individual pieces joined or coupled together. The components may be manufactured from a variety of different processes including an extrusion process, a mold, welding, shearing, punching welding, folding etc.

In one embodiment, first portion 304 may be shaped and sized to allow retraction and extension movements of second portion 306 in and out of an aperture. It is to be understood that shower rod 202 is designed and configured to be positioned between two parallel planar surfaces; however, it is within the spirit and scope of the claimed embodiments for at least one of first portion 304 or second portion 306 to be securely affixed to a planar surface in order to ensure safe and supported adjustment of shower rod 202.

In one embodiment, retraction and extension movements are powered by power source 211, wherein user 102 has the option of voicing a command received by sensor 210 to retract or extend shower rod 202 or user 102 may actuate the retraction or extension movement based off of commands inputted to waterproof display 216 and/or computing devices 108. In one embodiment, system 100 may be integrated into an entrance infrastructure 312, such as a shower curtain or shower door, in which sensor 210 functions as a motion sensor equipped with auto-close functionality configured to open and shut entrance infrastructure 312 based upon the command of user 102. For example, system 100 may initially be set in a closed configuration and upon sensor 210 detecting the presence of user 102 or detecting a swiping movement made by user 102 triggering sensor 210 to send an executable command to processor 112 to utilize power source 211 to actuate entrance infrastructure 312 into an open configuration. It is to be understood that processor 112 may include one or more processors, each of said processor having a different set of instructions and capabilities. One of said processors, for example, may be a chip or chipset that is configured for short-range wireless communication for exchanging data between devices over short distances using radio waves, such as UHF in the ISM bands, in a variety of frequencies, such as from 2.402 GHz to 2.48 GHz.

In one embodiment, automated triggering sensor 210 may occur after a predetermined amount of time in order to prevent release of water and steam from shower 110 when user 102 is not within. In one embodiment, this actuation step may be performed along shower rod 202 in combination with the extension and retraction movements in and out of the aperture, or independently of the extension and retraction of shower rod 202 via an opening and closing motion. It is to be understood that processor 112, sensor 210, lighting mechanism 212, and power source 211 are designed and configured to be integrated internally into shower rod 202 in a manner in which no components are required to be directly exposed to factors inherent to shower environments, such as excessive water and steam. In one embodiment, all functionalities provided throughout this disclosure may be performed in an automated capacity based on operations of processor 112 based on user/system preferences 208 or performed manually by user 102 via control inputs provided to a user interface of waterproof display 216, computing devices 108, or any other remote controller configured to be integrated in system 100.

Figure 4:
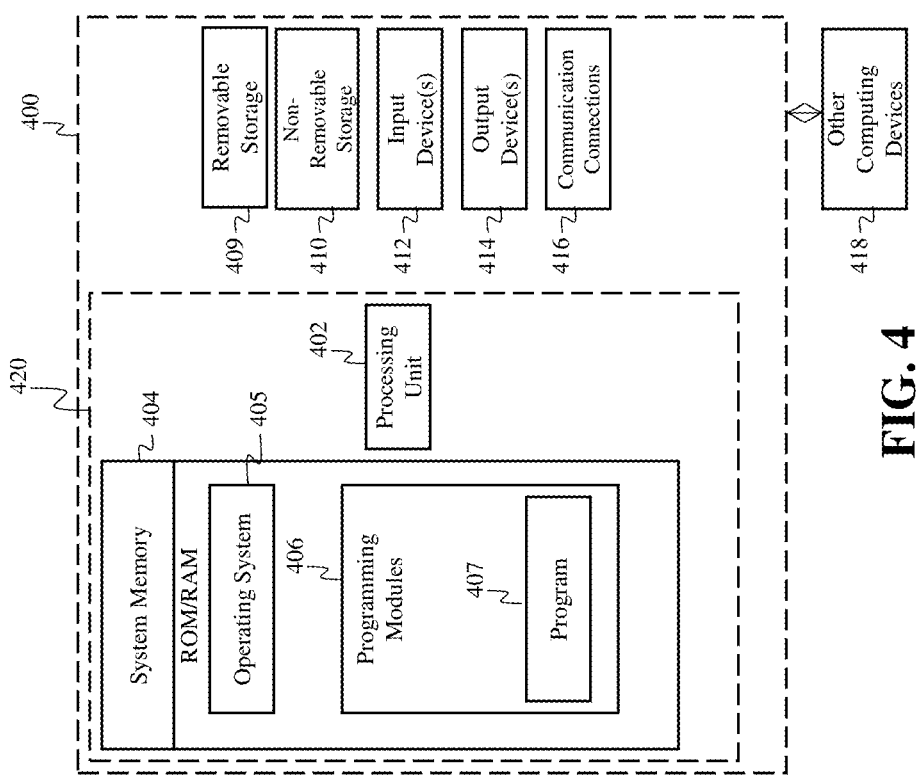
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by system 100 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100. Processes and data related to system 100 may operate in other environments and are not limited to computing device 400.

A system consistent with the claimed embodiments may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g., random-access memory (RAM)), non-volatile (e.g., read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of system 100 for example. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable, and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 400. Any such computer storage media may be part of system 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow system 100 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g., program module 407) may perform processes including, for example, one or more of the stages of a process. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with the claimed embodiments, program modules may include routines, programs, components, data structures, and other types of structures that may perform particular tasks or that may implement particular abstract data types. Moreover, the claimed embodiments may be practiced with other computer system configurations, including hand-held devices, multiprocessor systems, microprocessor-based or programmable consumer electronics, minicomputers, mainframe computers, and the like. The claimed embodiments may also be practiced in distributed computing environments where tasks are performed by remote processing devices that are linked through a communications network. In a distributed computing environment, program modules may be located in both local and remote memory storage devices.

Furthermore, the claimed embodiments may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. The claimed embodiments may also be practiced using other technologies capable of performing logical operations such as, for example, AND, OR, and NOT, including but not limited to mechanical, optical, fluidic, and quantum technologies. In addition, the claimed embodiments may be practiced within a general-purpose computer or in any other circuits or systems.

Embodiments claimed herein, for example, are described above with reference to block diagrams and/or operational illustrations of methods, systems, and computer program products according to the claimed embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments claimed herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed embodiments.

Referring now to the Figures, FIG. 5 and FIG. 8 show front views of the entertainment system 500, according to a second embodiment. The entertainment system 500 has an outer shaft 504 that includes a LED light panel 510, and an inner shaft 508 that is smaller than the outer shaft 504, and wherein both rods are connected in close telescopic engagement such that the inner shaft extends out of and retracts into the outer shaft. This allows adjusting the overall length of the shafts by twisting and moving the outer shaft 504 and the inner shaft 508 towards each other or away from each other, as is well known in the art. End caps 501 are located on the ends of the outer shaft 504 and the inner shaft 508, and each includes a rubber cap 506. The end caps 501 are in direct contact with and exert pressure against the shower walls, and a compression spring 507 is located between the end cap and the inner shaft 508 (see FIG. 6), which secures the system 500 in place. The rubber caps 506 create friction between the end caps 501 and the wall and prevent damage to the wall, such as scratching. The system 500 also includes a housing unit 502 with a display screen and/or touchscreen 505 (user interface) and four speakers 503 that can for playing sound.

Viewing FIG. 7 and FIG. 10, a side view of the entertainment system 500 shows the rubber cap 506 located at the end cap 501. The housing unit 502 is shown in side view, and the hanging portion 509 is also shown in side view, which hanging portion comprises a channel or groove 512 in the top surface. The curtain hooks 511 are attached to the hanging portion 509 by placing the top end of the curtain hook into the channel 512. The channel 512 is located at the top surface of the hanging portion 509 and extends across the system 500 to allow the curtain 513 to hang evenly horizontally across the system 500.

Turning now to FIG. 9, a rear view of the entertainment system 500, the outer shaft 504 and the inner shaft 508 run parallel to the hanging portion 509, which curves around the housing 502, to allow the curtains to run smoothly across system 500 without interference from the housing unit 502.

Figures 11, 12:
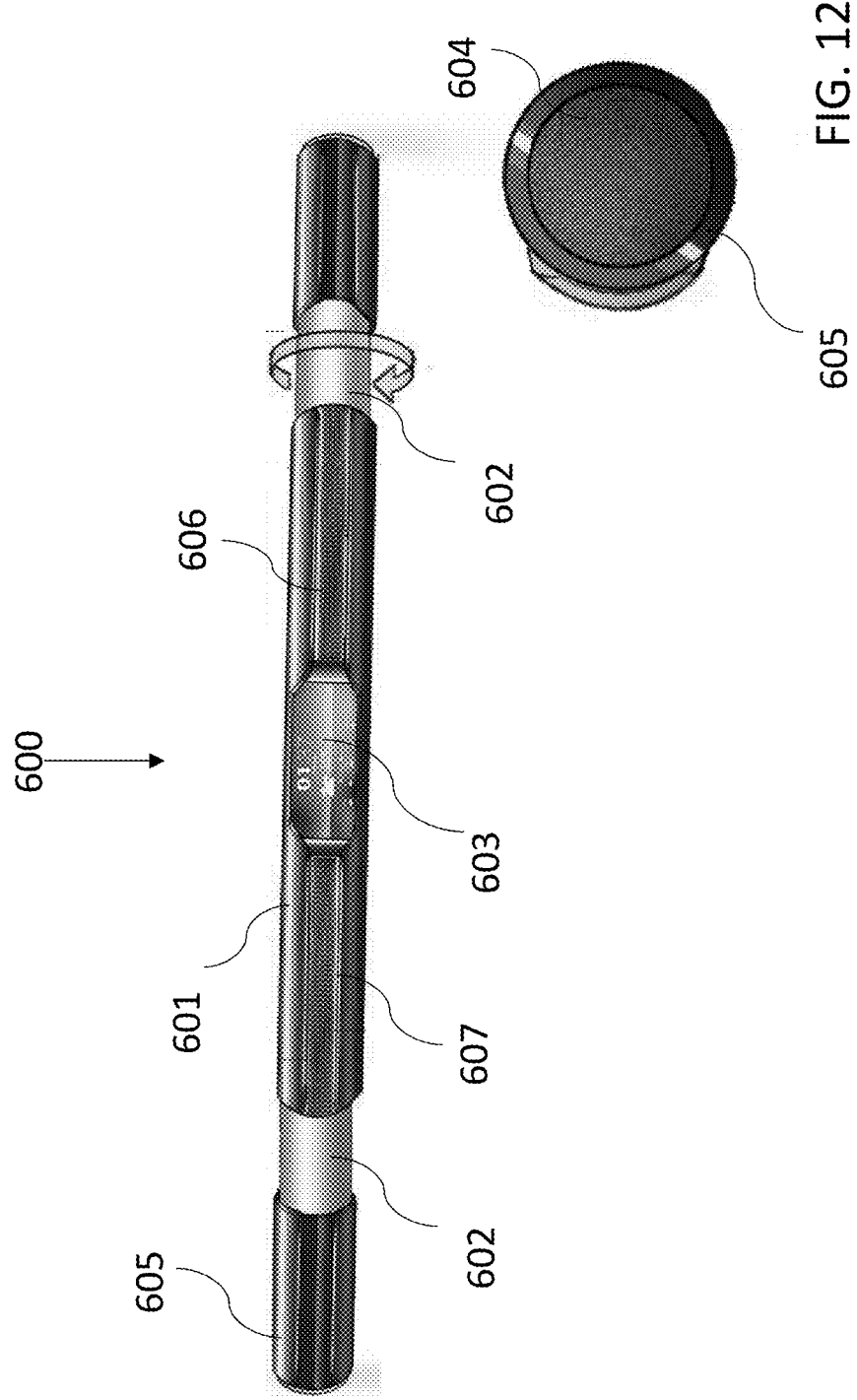
FIG. 11 is an illustration of a front view of a waterproof entertainment system, according to a third example embodiment.
FIG. 12 is an illustration of a side view of a waterproof entertainment system, according to the third example embodiment.

Attention is now directed to FIG. 11, showing a perspective view of the entertainment system 600 in a third embodiment. The entertainment system 600 is formed by an outer shaft 601 and two inner shafts 602, wherein the rods are connected in telescopic engagement, similar to the system 500. This allows adjusting the overall length of the system by twisting and moving the outer shaft 601 and the inner shafts 602 towards each other or away from each other, as is well known in the art. The outer shaft 601 in this embodiment comprises the housing unit that includes a display screen and/or touchscreen 603, speakers 606, and an LED light panel 607 to play music and emanate light, among other uses. Long tube-shaped end caps 605 are located on the outer ends of the inner shafts 508, and each includes a rubber cap 604 (see FIG. 12).

Figure 13:
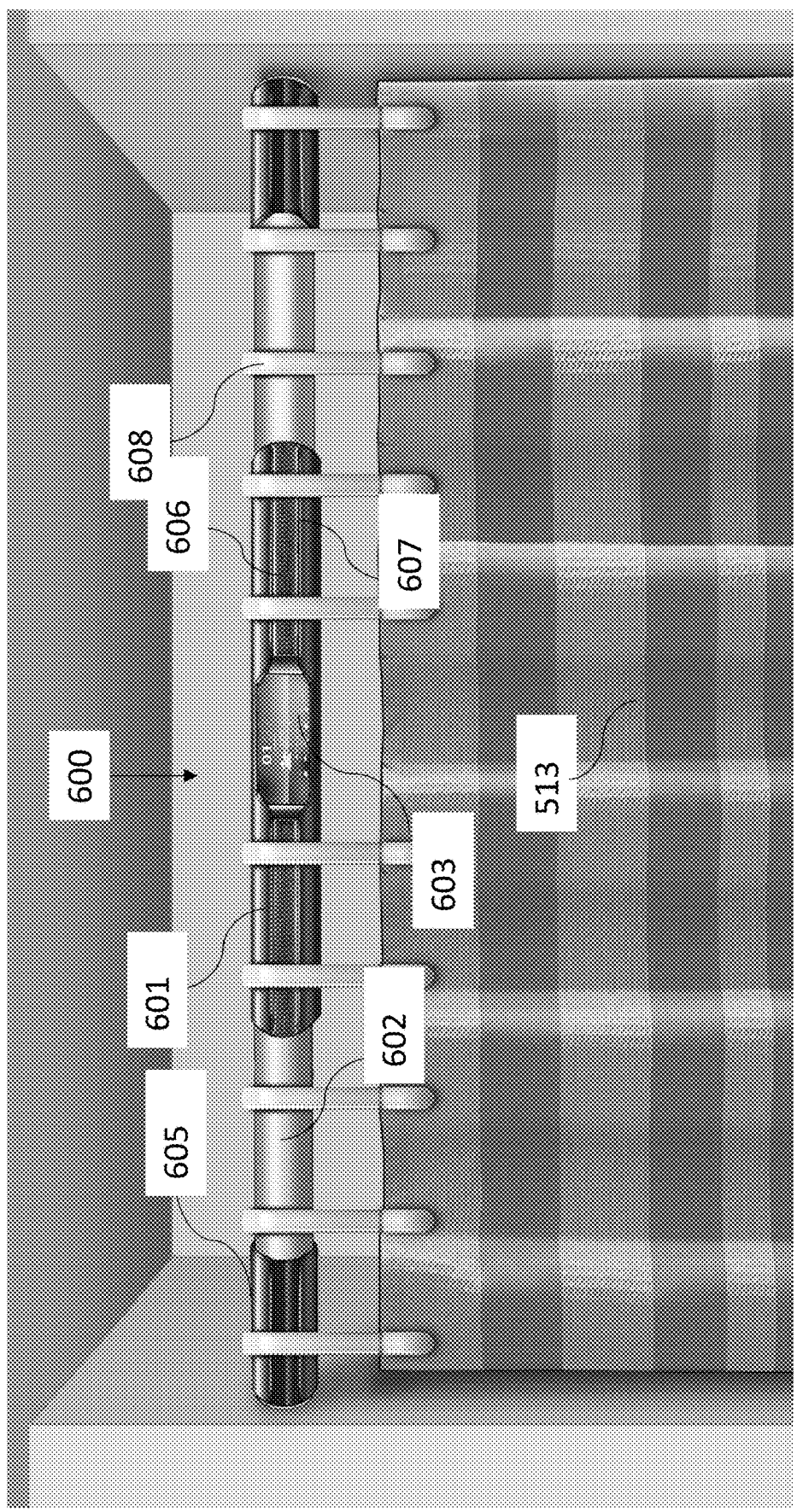
FIG. 13 is an illustration of a front view of a waterproof entertainment system with shower curtain, according to the third example embodiment.
Figure 16:
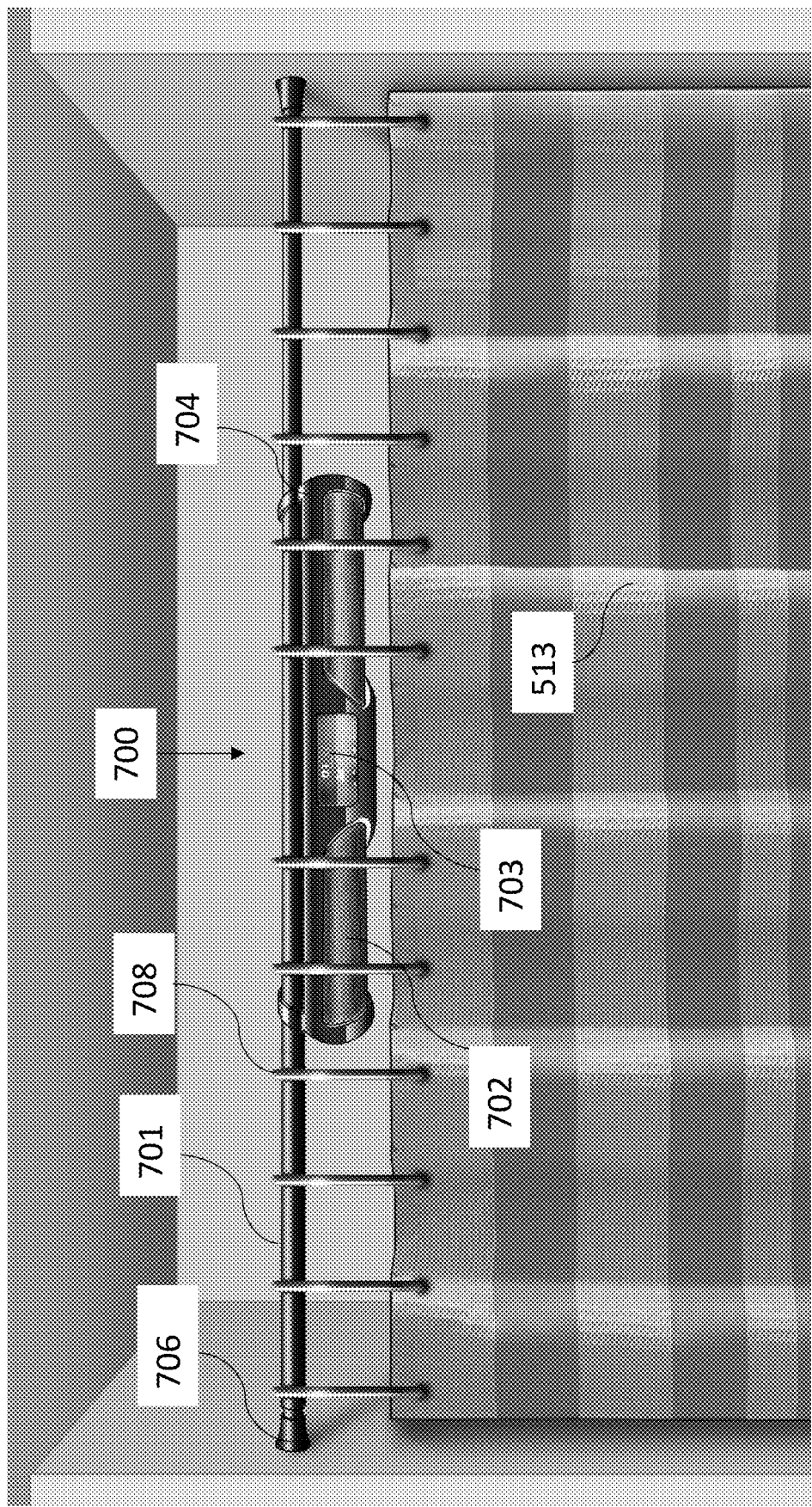
FIG. 16 is an illustration of a front view of a waterproof entertainment system with shower curtain, according to the fourth example embodiment.

As illustrated in FIG. 13, showing the entertainment system 600 in use, the end caps 605 are in direct contact with, and exert pressure against, the shower walls, which holds the entertainment system 600 in place. The added rubber caps 604 work to create friction between the end caps 605 and the wall and prevent damage to the wall, such as scratching. This embodiment of system 600 allows for the curtain hooks 608 to hang from the outer shaft 601, the inner shafts 602, and the end caps 605, without needing a special hanging portion for the curtain 513. The placement of the curtain hooks 608 on the outer shaft 601 does not affect the use of the display screen 603, speakers 606, or the LED light panel 607.

Turning now to FIG. 14, showing a perspective view of the fourth embodiment of the device. The entertainment system 700 is comprised of a shaft 701 with end caps 706 that include thinner shafts 719 coupled in a telescopic engagement with the shaft 701. Such connection allows adjusting the overall length of the system by twisting and moving the shaft 701, and the thinner shafts 719 towards each other or away from each other, as is well known in the art. The housing unit 704 is coupled to a bottom of the shaft 701 and includes a display screen 703 and speakers 702 with surrounding LED light panels 707.

FIG. 15, a side view of the entertainment system 700 shows the rubber cap 705 placed at the end cap 706. The housing unit 704 is wider than the shaft 701, as shown in this side view. The added rubber caps 705 work to create friction between the end caps 706 and the wall and prevent damage to the wall, such as scratching.

This embodiment of the entertainment system 700 allows the curtain hooks 708 to hang from the shaft 701, the housing unit 704, and the end caps 706, without the need for a special hanging portion to hang the curtain 513. In addition, the placement of the curtain hooks 708 on top of the housing unit 704 does not affect the use of the display screen 703, speakers 702, or the LED light panel 707.

Referring now to FIG. 17 and FIG. 19, showing a perspective view of a fifth embodiment of the entertainment system 800. The tension rod in this embodiment has two thinner shafts 803 and a housing unit 807, that functions as an outer shaft, wherein the rods are connected in telescopic engagement. This allows adjusting the overall length of the system by twisting and moving the housing unit 802 that functions as the outer shaft and the thinner shafts 803 towards each other or away from each other, as is well known in the art. The housing unit 802 comprises a display screen and/or touchscreen 806, speakers 801, a LED light panel 808, and a securing hook 819 that secures the housing unit 802 in place, as illustrated in FIG. 18. The housing unit 802 may have a removable rechargeable battery 805 attached to the system behind the display screen 806 (see FIG. 19).

Figure 20:
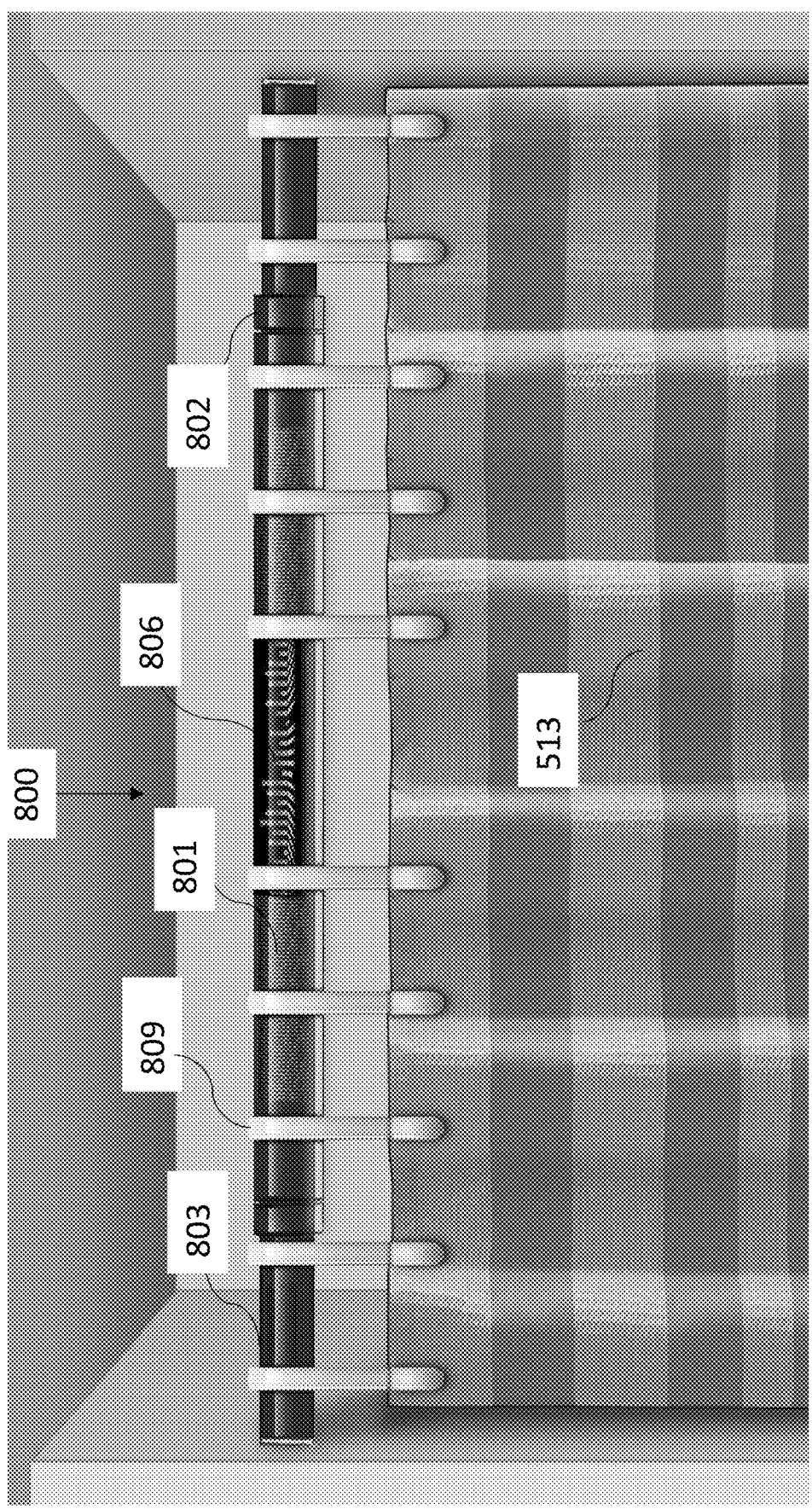
FIG. 20 is an illustration of a front view of a waterproof entertainment system with shower curtain, according to the fifth example embodiment.

As illustrated in FIG. 20, showing the entertainment system 800 in use, the thinner shafts 803 also work as end caps that are in direct contact with, and exert pressure against, the shower walls, allowing the entertainment system 800 to remain in place. The added rubber caps 804 (see FIG. 18) create friction between the thinner shaft 803 and the wall and prevent damage to the wall, such as scratching. This embodiment of the system 800 allows for the curtain hooks 809 to hang from the entire device without needing a special hanging portion for the curtain 513. Placement of the curtain hooks 809 on the housing unit 807 does not affect the use of the display screen 806, speakers 801, or the LED light panel 808.

Moving on to FIG. 21, shows a perspective view of a sixth embodiment of the entertainment system 900. The system comprises two thinner shafts 902 that also work as end caps, a housing unit 901 that works as the outer shaft, wherein the shafts are connected in telescopic engagement. This allows adjusting the overall length of the system by twisting and moving the housing unit 901 that functions as the outer shaft and the thinner shafts 902 towards each other or away from each other, as is well known in the art. The housing unit 901 includes a display screen and/or touchscreen 903, speaker covers 902 for the speakers 907, LED light panels 905, and a removable rechargeable battery 904 (see FIG. 22).

Figure 23:
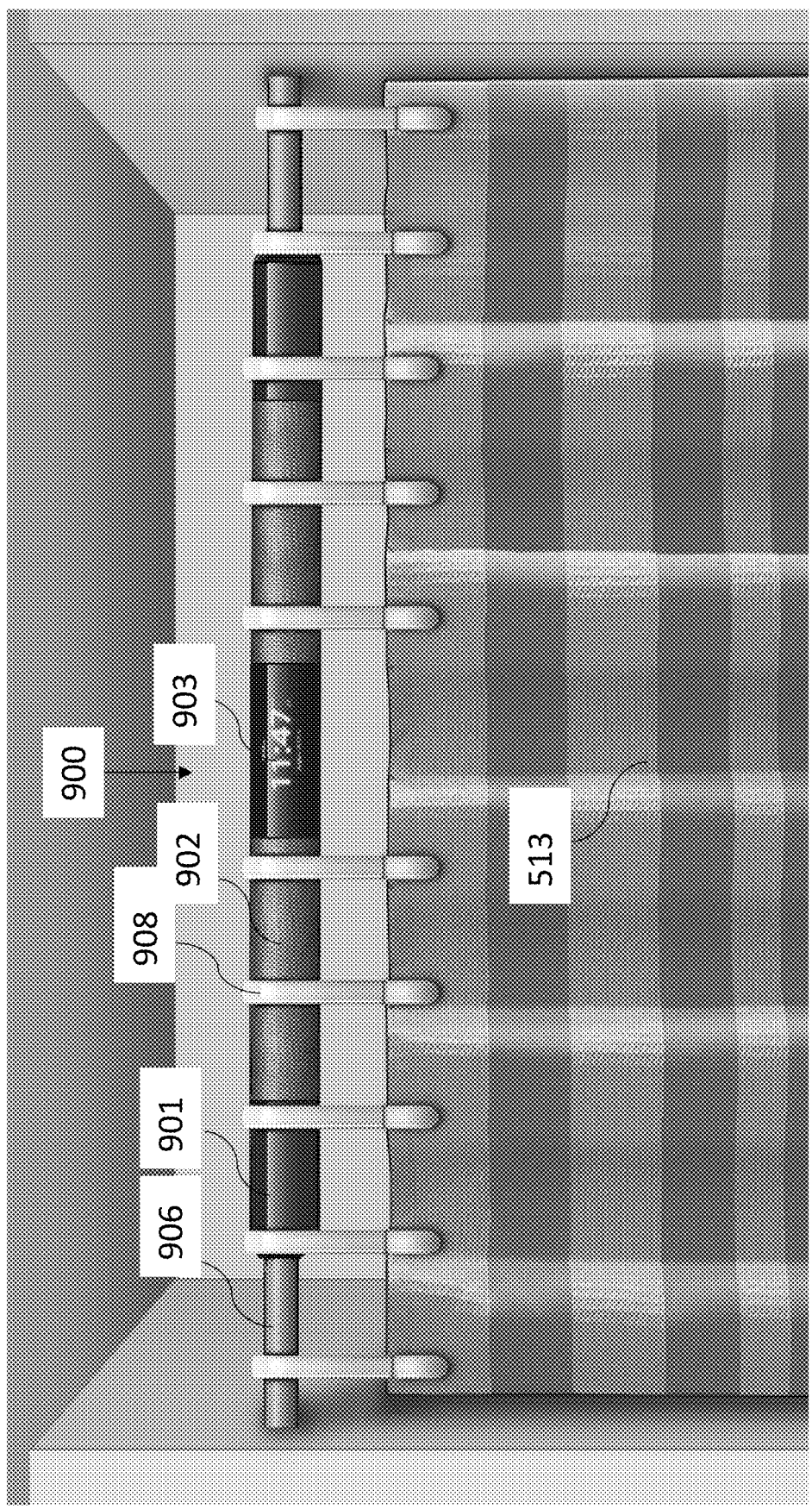
FIG. 23 is an illustration of a front view of a waterproof entertainment system with shower curtain, according to the sixth example embodiment.
Figure 29:
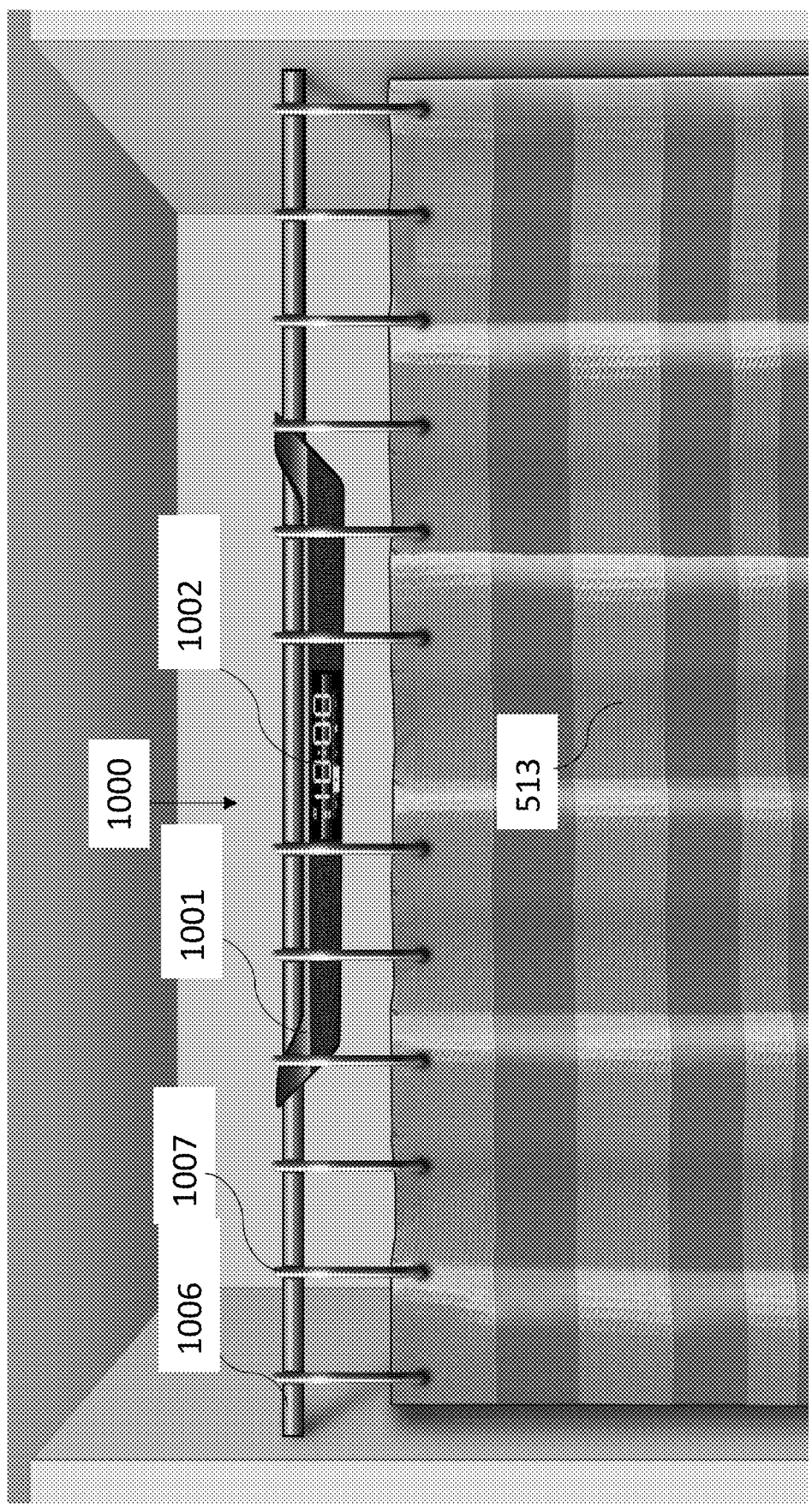
FIG. 29 is an illustration of a front view of a waterproof entertainment system with shower curtain, according to the seventh example embodiment.

As FIG. 23 shows, the thinner shafts 902 work as the end caps in this embodiment. The thinner shafts 902 are in direct contact with the shower walls and exert pressure against the shower walls due to the telescopic engagement with the housing unit 901 that functions as the outer shaft. Such tension exerted by the thinner shafts 902 against the wall allows the entertainment system 900 to remain in place. This embodiment of the system 900 allows for the curtain hooks 908 to hang from the entire device without needing a special hanging portion for the curtain 513. The placement of the curtain hooks 908 on the housing unit 901 does not affect the use of the display screen 903, speakers 907, or the LED light panels 905.

Turning to FIG. 24, a perspective view of the seventh embodiment is provided in the entertainment system 1000. The entertainment system 1000 has a contracting shaft 1006 that extends through two openings on the back of the housing unit 1001. The housing unit 10001 has a display screen and/or touchscreen 002 located adjacent to a removable rechargeable battery 1004 (see FIG. 26), speakers 1005, and LED light panels 1003 on the back of the housing unit 1001 (see FIG. 25). FIG. 27 shows an internal side view of the housing unit 1001 indicating where the speakers 1005 and LED light panels 103 are located.

As shown in the perspective view of FIG. 28, the contracting shaft 1006 of the entertainment system 1000 works as the end caps in this embodiment. The contracting shafts 1006 are in direct contact with the shower walls and exert pressure against said walls. Such tension exerted by the contracting shafts 1006 against the wall allows the entertainment system 1000 to remain in place. This embodiment of the entertainment system 1000 allows for the curtain hooks 1007 to hang from the entire device without needing a special hanging portion for the curtain 513. The placement of the curtain hooks 1007 on the housing unit 1001 does not affect the use of the display screen 1002, speakers 1005, or the LED light panels 1003.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A shower entertainment system, comprising:
a horizontally extendable shower rod comprising a first portion and a second portion, wherein the second portion is configured to retract into and extend from a channel disposed within the first portion;
a housing integrally formed with the first portion of the shower rod;
a plurality of lights disposed along an exterior surface of the shower rod;
a plurality of speakers disposed within the housing, the plurality of speakers configured for playing sounds;
a processor disposed within the housing, the processor communicably coupled to the plurality of lights and the plurality of speakers, the processor configured for: 1) receiving audio data, via radio frequency, and playing said audio data on the plurality of speakers, and 2) activating and deactivating the plurality of lights;
an exposed groove disposed along a top of the housing and extending from a first end of the housing to a second end of the housing, the groove configured for insertion of a plurality of hooks from which a shower curtain is hung, wherein the groove is configured to accept insertion of said plurality of hooks from a top direction, and further configured to allow removal of said plurality of hooks via an upwards movement; and
a rechargeable battery disposed within the housing, the rechargeable battery configured for providing power to the plurality of lights, the plurality of speakers and the processor.

2. The shower entertainment system of claim 1, wherein the first portion comprises a track disposed within the channel comprising a rail configured for the second portion to slide along.

3. The shower entertainment system of claim 1, wherein the second portion comprises a plurality of grooves equally spaced apart from each other, wherein each groove of the plurality of grooves are configured to indicate a different length of the shower rod based on a position of the second portion.

4. The shower entertainment system of claim 3, wherein the shower rod further comprises a plurality of configurations wherein each configuration is based upon which groove of the plurality of grooves the first portion is in direct contact with.

5. The shower entertainment system of claim 1, wherein the processor is further configured to be communicatively coupled, via radio frequency, to at least one computing device via the communications network.

6. The shower entertainment system of claim 5, wherein audio data is configured to be sourced from the at least one computing device and further configured to control operations associated with the shower entertainment system.

7. The shower entertainment system of claim 1, wherein the shower rod further comprises at least one sensor configured to be communicatively coupled to the at least one processor.

8. The shower entertainment system of claim 7, wherein the at least one sensor is a motion detector configured to activate power from the rechargeable battery to the processor.

9. The shower entertainment system of claim 1, further comprising a waterproof visual display configured to be communicatively coupled to the processor.

10. The shower entertainment system of claim 1, wherein each of the plurality of lights are light-emitting diodes.

11. A shower entertainment system, comprising:
a horizontally extendable shower rod comprising a first portion and a second portion, wherein the second portion is configured to retract into and extend from a channel disposed within the first portion;
a housing integrally formed with the first portion of the shower rod;
a plurality of lights disposed along an exterior surface of the shower rod; a plurality of speakers configured for playing sounds; a processor communicably coupled to the plurality of lights and the plurality of speakers, the processor configured for:
1) receiving audio data, via radio frequency, and playing said audio data on the plurality of speakers, and
2) activating and deactivating the plurality of lights; a user interface communicably coupled with the processor; and a rechargeable battery configured for providing power to the plurality of lights, the plurality of speakers and the processor, an exposed groove disposed along a top of the housing and extending from a first end of the housing to a second end of the housing, the groove configured for insertion of a plurality of hooks from which a shower curtain is hung, wherein the groove is configured to accept insertion of said plurality of hooks from a top direction, and further configured to allow removal of said plurality of hooks via an upwards movement; and a rechargeable battery configured for providing power to the plurality of lights, the plurality of speakers and the processor.

12. The shower entertainment system of claim 11, wherein the first portion comprises a track disposed within the channel comprising a rail configured for the second portion to slide along.

13. The shower entertainment system of claim 11, wherein the second portion comprises a plurality of grooves equally spaced apart from each other, wherein each groove of the plurality of grooves are configured to indicate a different length of the shower rod based on a position of the second portion.

14. The shower entertainment system of claim 13, wherein the shower rod further comprises a plurality of configurations wherein each configuration is based upon which groove of the plurality of grooves the first portion is in direct contact with.

15. The shower entertainment system of claim 11, wherein the processor is further configured to be communicatively coupled, via radio frequency, to at least one computing device via the communications network.

16. The shower entertainment system of claim 15, wherein audio data is configured to be sourced from the at least one computing device and further configured to control operations associated with the shower entertainment system.

17. The shower entertainment system of claim 11, wherein the shower rod further comprises at least one sensor configured to be communicatively coupled to the at least one processor.

18. The shower entertainment system of claim 17, wherein the at least one sensor is a motion detector configured to activate power from the rechargeable battery to the processor.

19. The shower entertainment system of claim 11, further comprising a waterproof visual display configured to be communicatively coupled to the processor.

20. The shower entertainment system of claim 11, wherein each of the plurality of lights are light-emitting diodes.

* * * * *